United States Patent [19]
Umemoto et al.

[11] Patent Number: 5,123,293
[45] Date of Patent: Jun. 23, 1992

[54] AUTOMOTIVE TRANSMISSION SYSTEM

[75] Inventors: Tomeo Umemoto; Eisaku Shinohara, both of Osaka, Japan

[73] Assignee: Kubota Corporation, Osaka, Japan

[21] Appl. No.: 582,058

[22] Filed: Sep. 14, 1990

[30] Foreign Application Priority Data

Oct. 27, 1989 [JP] Japan .................. 1-280616

[51] Int. Cl.$^5$ .................. F16H 3/08; F16H 37/00
[52] U.S. Cl. .................. 74/333; 74/15.63;
74/15.66; 475/207; 180/53.1; 180/53.62;
180/247
[58] Field of Search ............ 475/207; 74/15.63, 15.66,
74/467, 333, 745; 180/53.1, 53.62, 247, 248

[56] References Cited

U.S. PATENT DOCUMENTS

| | | | |
|---|---|---|---|
| 2,913,064 | 11/1959 | Ferguson et al. | 475/207 X |
| 3,487,724 | 1/1970 | McIntyre et al. | 475/207 |
| 3,508,630 | 4/1970 | Keller et al. | 74/467 X |
| 3,799,003 | 3/1974 | Van Dest | 475/207 X |
| 4,072,067 | 2/1978 | Benthake | 74/467 X |
| 4,208,923 | 6/1980 | Ikegomi | 74/15.63 |
| 4,231,266 | 11/1980 | Nishikawa et al. | 74/467 |
| 4,275,608 | 1/1981 | Brancolini | 475/207 X |
| 4,294,131 | 10/1981 | Murayama | 475/207 X |
| 4,309,916 | 1/1982 | Ohkuma et al. | 74/467 |
| 4,318,305 | 3/1982 | Wetrich et al. | 475/207 X |
| 4,404,869 | 9/1983 | Numazawa et al. | 475/207 |
| 4,495,830 | 1/1985 | Yasue et al. | 74/467 |
| 4,572,026 | 2/1986 | Weiss | 74/15.66 X |
| 4,583,416 | 4/1986 | Müller | 74/467 |
| 4,750,580 | 6/1988 | Umemoto | 74/15.63 X |
| 4,794,807 | 1/1989 | Horii et al. | 74/15.66 X |
| 4,915,193 | 4/1990 | Marquart | 74/467 X |

FOREIGN PATENT DOCUMENTS

3217993 11/1983 Fed. Rep. of Germany ...... 475/207

OTHER PUBLICATIONS

Lynwander, Peter, *Gear Drive System Design and Application*, Marcel Dekker, Inc., New York, N.Y., pp. 223–225.

*Primary Examiner*—Leslie A. Braun
*Assistant Examiner*—David E. Henn

[57] ABSTRACT

An automotive transmission system of the present invention comprises a transmission mechanism housed in a transmission case and operatively connected to an engine, and a hydraulically operated speed mode change mechanism and a hydraulically operated shuttle mechanism both operatively connected to the transmission mechanism. The hydraulically operated speed mode change mechanism is provided at the inlet side of the transmission mechanism. The hydraulically operated shuttle transmission mechanism is provided at the output side of the transmission mechanism and submerged in oil contained in the lower portion of the transmission case.

4 Claims, 4 Drawing Sheets

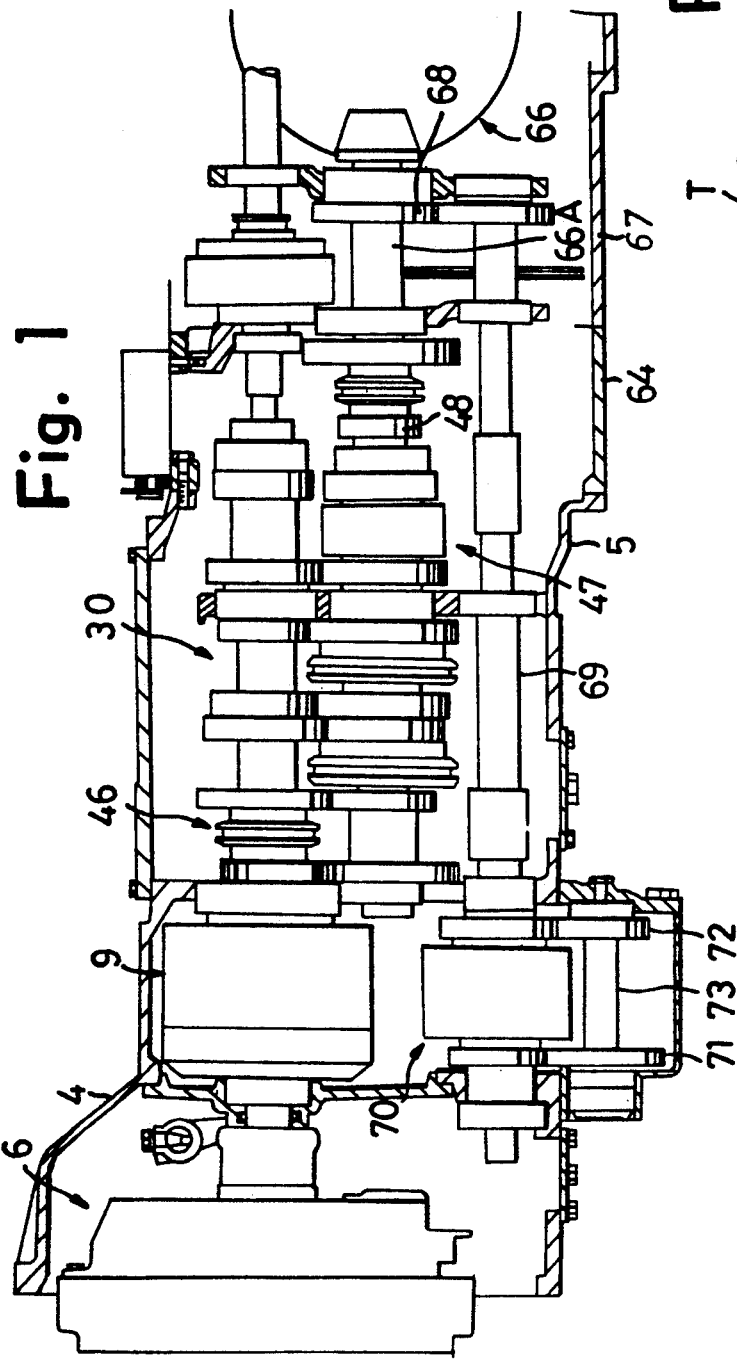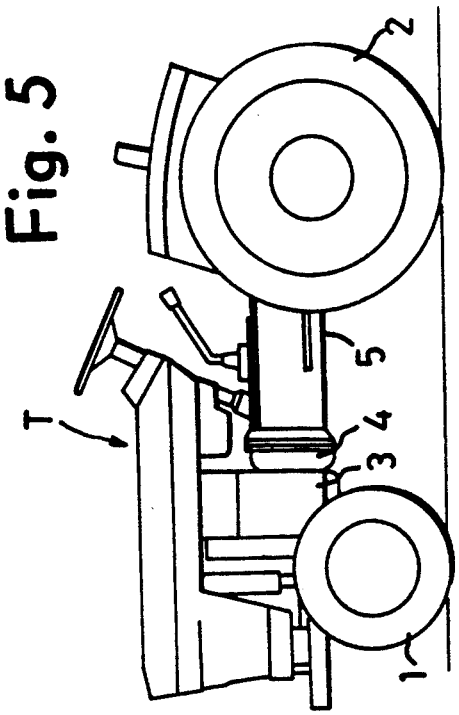

AUTOMOTIVE TRANSMISSION SYSTEM

FIELD OF THE INVENTION AND RELATED ART STATEMENT

The present invention relates to an automotive transmission system for use in a tractor and the like.

It is well known to incorporate a shuttle transmission unit into a transmission so as to perform the loading function. One such transmission is disclosed, for example, in Examined Japanese Utility Model Publication SHO 62-38815.

It is also well known to include a speed mode changing unit in the transmission.

Although such a conventional transmission includes either a shuttle transmission unit or speed mode changing unit, none of such prior art transmissions includes both units. The quality, operability and manueverability of the existing transmission have not fully satisfied the customer's need.

OBJECTS AND SUMMARY OF THE INVENTION

Accordingly, it is an object of the present invention to provide an automotive transmission system which improves the quality, operability and maneuverability by incorporating both a speed mode change mechanism and a shuttle transmission mechanism, and which improves the durability by submerging in oil the shuttle transmission mechanism to which a great torque is applied.

It is another object of the present invention to provide an automotive transmission system which allows a speed mode change mechanism to be incorporated into a small transmission case by employing planet gear means which is compact and provides a great reduction gear ratio.

According to the present invention, there is provided an automotive transmission system comprising a transmission mechanism housed in a transmission case and operatively coupled to an engine, and a hydraulically operated speed mode change mechanism and a hydraulically operated shuttle mechanism operatively connected to the transmission mechanism, characterized in that the hydraulically operated speed mode change mechanism is provided at the inlet side of the transmission mechanism, and the hydraulically operated shuttle transmission mechanism is provided at the output side of the transmission mechanism and submerged in oil contained in the lower portion of the transmission case.

The hydraulically operated speed mode change mechanism includes a ring gear fixedly mounted to a propeller shaft, the propeller shaft being operatively connected to the engine through a main clutch, a carrier rotatably supported by the ring gear and having a coaxial sun gear, a plurality of planet gears supported by the carrier and meshed with the ring gear and the sun gear, an output shaft coaxial with the propeller shaft, the output shaft extending coaxially of the carrier and serving as an input shaft of the transmission mechanism, a cylindrical support fit around the output shaft and fixed to a wall of the transmission case, a clutch body fit around and rotatably supported by the support and coupled to the sun gear, and a hydraulic piston received in a cylinder chamber defined in the clutch body and adapted to lock and unlock the carrier through a clutch element.

The transmission mechanism of the present system includes a transmission shaft extending coaxially from one end of the output shaft of the hydraulically operated speed mode change mechanism, a secondary transmission shaft extending parallel to and below the transmission shaft, a series of gears mounted on the transmission shaft, and a series of gears mounted on the secondary transmission shaft, the series of gears being constantly meshed in a synchronous fashion and shiftable by shifters so as to change a gear ratio. The transmission mechanism further comprises a secondary transmission mechanism adjacent to the speed mode change mechanism. The secondary transmission mechanism has gear means shiftable between high and low speed modes.

The hydraulically operated shuttle transmission mechanism of the present invention comprises a clutch shaft extending coaxially and rearwardly from the secondary transmission shaft of the transmission mechanism, a clutch body mounted on the clutch shaft and defining front and rear cylinder chambers, pistons received in the cylinder chambers and clutch elements urged by the pistons against the action of springs, the clutch shaft being rotated in a clockwise direction when one of the clutch element is urged and rotated in a counterclockwise direction when the other clutch element is urged. A differential is located rearwardly of the hydraulically operated shuttle transmission mechanism and operatively connected thereto through the clutch shaft.

According to the present invention, when a selector lever (not shown) is moved to a high-speed position, oil supplied by a hydraulic pump through a control valve enters into the cylinder chamber in the speed change mode mechanism.

The piston is then moved to compress the spring so as to urge the steel plate and clutch disk (clutch element) in the high-speed mode against the pressure plate. The carrier is thereby fixed to the sun gear through the hydraulic clutch. As a result, the ring gear, the planet gears, the carrier and the sun gear are rotated together.

As such, the rotation of the propeller shaft (input shaft of the hydraulically operated speed mode change mechanism) is constantly transmitted to the input shaft of the transmission mechanism (output shaft of the hydraulically operated speed mode change mechanism).

On the other hand, when the selector lever is shifted to a low-speed position, the oil is prevented from being fed to the cylinder chamber in the hydraulically operated speed mode change mechanism.

The piston is then moved to urge the clutch element in the low-speed mode against the pressure plate under the action of the spring.

The sun gear in thereby fixed to the support (transmission case) through the hydraulic clutch and can no longer be rotated.

Accordingly, the rotation of the propeller shaft is transmitted to the input shaft at the following gear ratio.

$$\frac{\text{the number of sun gear teeth}}{\text{the number of sun gear teeth} = \text{the number of ring gear teeth}}$$

The rotation of the propeller shaft is transmitted to the input shaft of the transmission mechanism through the speed mode change mechanism.

At the outlet side of the transmission mechanism, oil is fed to one of the cylinder chambers in the hydraulically operated shuttle transmission mechanism. The piston is then moved to urge the clutch element against the pressure plate against the action of the spring. This causes direction coupling of the output shaft of the transmission mechanism with the shuttle transmission shaft (clutch shaft). The rotation of the transmission shaft is then transmitted to the differential and the like in the same fashion.

On the other hand, when oil is fed to the other cylinder chamber, the piston within the other cylinder chamber is moved to urge the clutch element against the pressure plate against the action of the spring. The rotation of the output shaft of the transmission mechanism is transmitted through the transmission mechanism to rotate the shuttle transmission shaft in the reverse direction.

The hydraulically operated shuttle transmission mechanism is subject to a great torque. To this end, this mechanism is submerged in a lubricating oil in the transmission case.

BRIEF DESCRIPTION OF THE DRAWINGS

In the drawings wherein a preferred embodiment of the present invention is illustrated:

FIG. 1 is an elevational view, in section, of a transmission system of the present invention disposed between a clutch and a differential and housed in a transmission case;

FIG. 5 is a side view of a tractor to which the transmission system of the present invention is applied.

DESCRIPTION OF THE PREFERRED EMBODIMENTS

Figure 2:
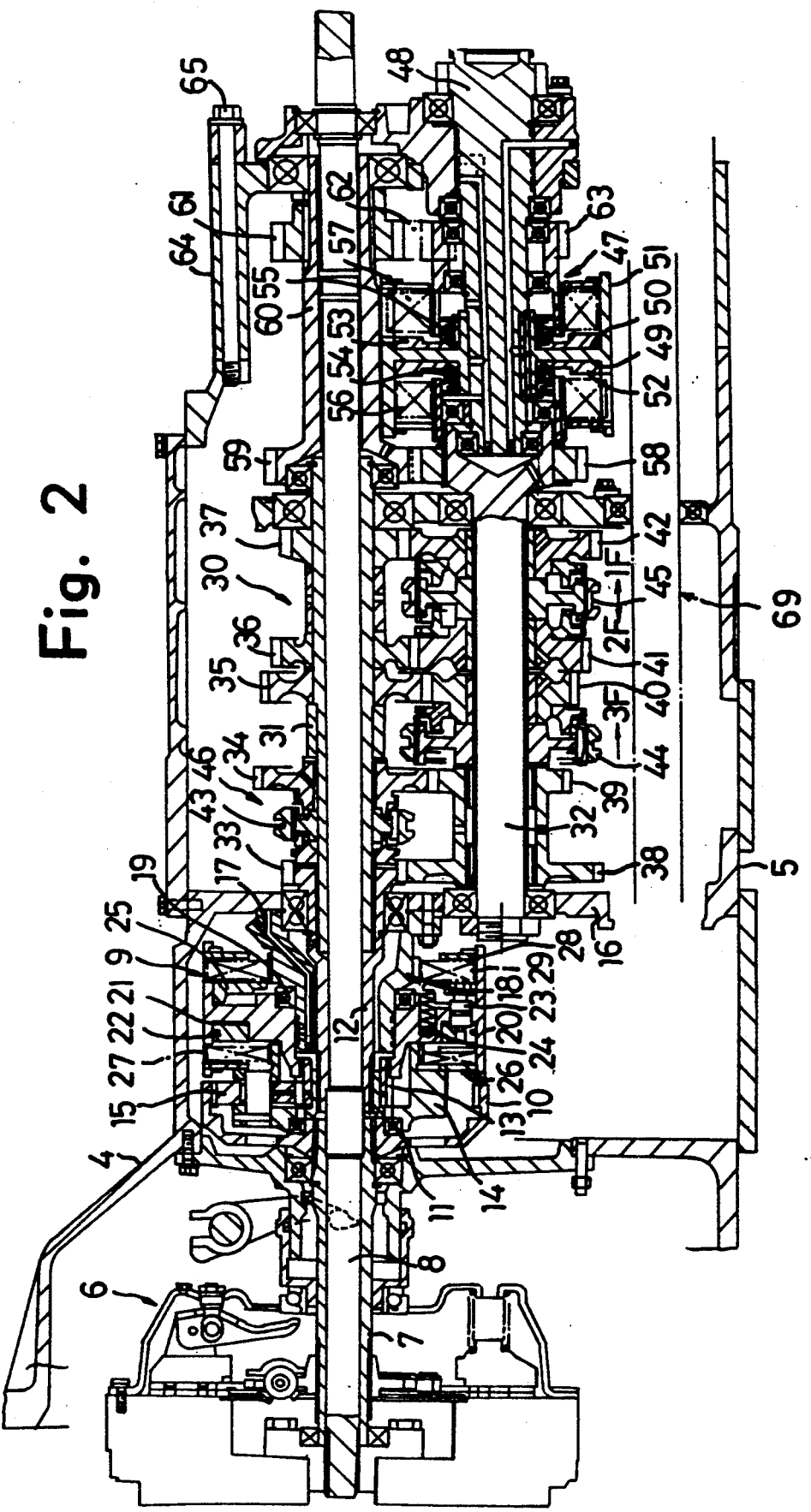
FIG. 2 is an elevational view, in seciton, of the transmission system shown in FIG. 1.

The present invention will now be described in detail with reference to the drawings.

With reference to FIG. 5, there is shown a two-axle, four-wheel tractor T to which the present invention is applicable. The tractor T includes right and left front wheels 1 and right and left rear wheels 2. An engine 3 is mounted in the tractor T and covered by a hood. A clutch housing 4 and a transmission case 5 are coupled to the engine 3 to together form a tractor body.

With reference to FIGS. 1 and 2, there is shown an automotive transmission system. A main clutch 6 is mounted to the output shaft of the engine 3 and housed in the clutch housing 4. The main clutch 6 is engaged or disengaged to connect or disconnect the output shaft of the engine to or from a propeller shaft 7. The propeller shaft 7 is in the form of a cylindrical tube. A power takeoff shaft 8 is inserted into the propeller shaft 7 and directly coupled to the engine.

A hydraulically operated speed mode changed mechanism 9 is operatively connected to the engine 3 through the propeller shaft 7. In the illustrated embodiment, the mechanism 9 is in the form of a planetary gearset.

Figure 3:
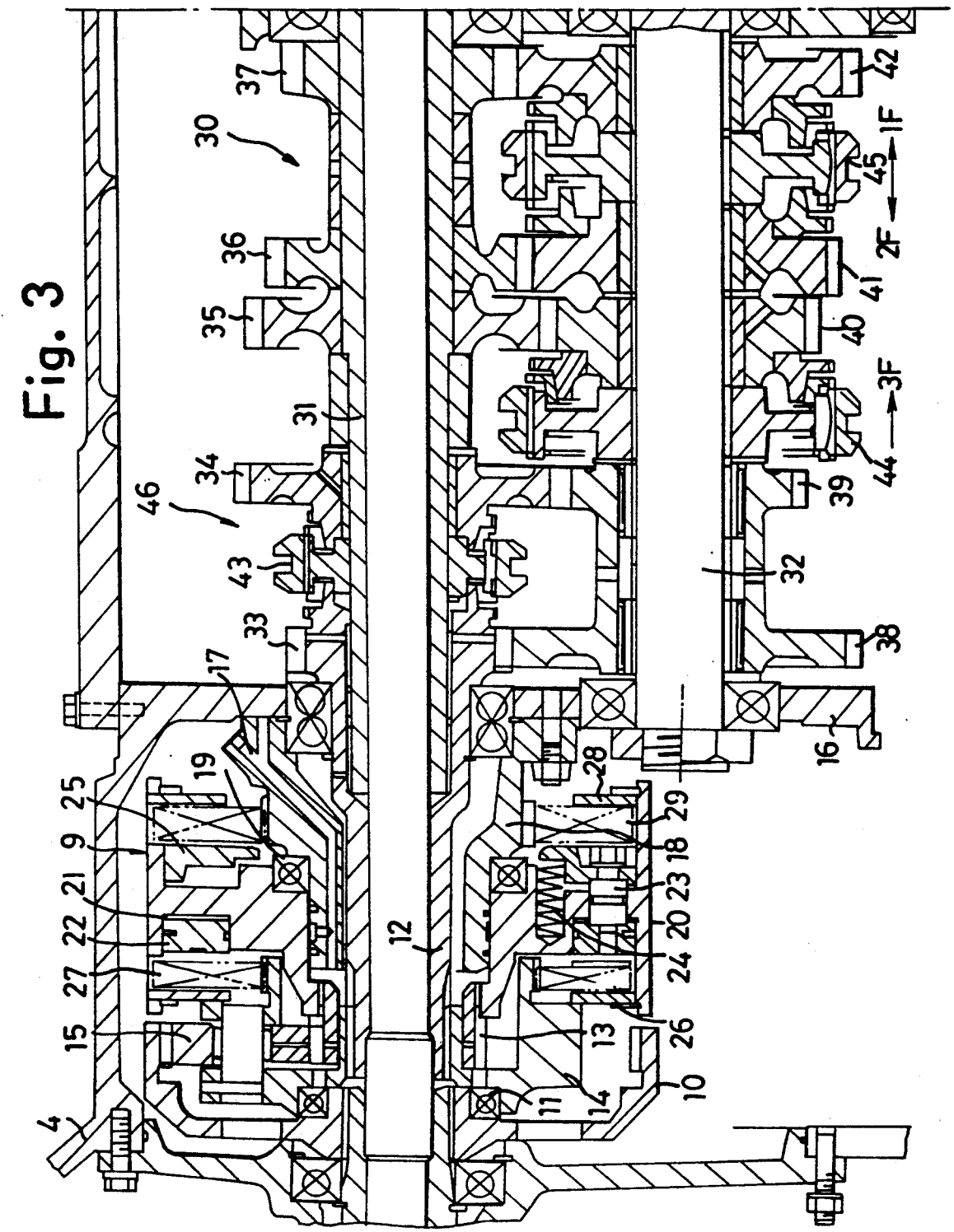
FIG. 3 is an elevational view, in section, of a hydraulically operated speed mode change mechanism and the front portion of a transmission mechanism in the transmission system of the present invention.

As shown in FIGS. 2 and 3, the speed made change mechanism 9 includes, among others, a ring gear 10 fixedly mounted to the propeller shaft 7, a carrier 14 supported by the ring gear tharough a bearing 11 and having a sun gear 13 provided on an output shaft 12 as an input shaft of a transmission mechanism 30, a plurality of planet gears 15 supported by the carrier 14 and meshed with the ring gear 10 and the sun gear 13, a cylindrical support 18 fixed to a wall 16 of the transmission case 5 and having an oil passage 17 and the like, a clutch body 20 fit around and rotatably supported by the support 18 through a bearing 19, a piston 22 received in a cylinder chamber 21 defined in the body 20 a spring seat 25 connected to the piston 22 through a rod 23, a spring 24 seated on the spring seat 25, a clutch element 27 urged against a pressure plate 28 by the piston 22, and a clutch element 29 disposed between the spring seat 25 and the pressure plate 29.

The clutch element 27 is composed of a clutch disk and a steel plate mounted to the carrier 14. Also, the clutch element 29 is composed of a clutch disk and a steel plate mounted to the support 18.

The hydraulically operated speed mode change mechanism 9 is located in the upper front portion of the transmission case 5. The transmission mechananism 30 is located behind the speed mode change mechanism 9. In the illustrated embodiment shown in FIGS. 1 to 4, the transmission mechanism 30 includes a transmission shaft 31 extending coaxially and rearwardly of the propeller shaft 7. The transmission shaft 31 is in the form of a cylindrical tube. A secondary transmission shaft 32 extends parallel to and below the transmission shaft 31. A series of gears is mounted on the transmission shaft 31 and the secondary transmission shaft 32. Shifters 43 to 45 are used to change from a high-speed mode to a low-speed mode and vice versa. This mechanism 30 is of the type in which gears are constantly in mesh with one another in a synchronous fashion. The gear 33 is mounted on the rear end of the input shaft 12. The hydraulically operated speed mode change mechanism 9 is provided at the input side of the transmission mechanism 30.

Further, the gears 33, 34, 38 and 39 together form a secondary transmission mechanism 46 which is shifted between a high-speed mode and a low-speed mode by the shifter 43. This mechanism 46 is situated at the front half of the transmission mechanism 30.

FIG. 3 shows the neutral position of the transmission mechanism. The shifter 43 may be shifted in the A direction to couple the gear 34 with the transmission shaft 31 and simultaneously the shifter 45 is shifted in the 1F direction to couple the gear 42 with the secondary transmission shaft 32. Thereby, the flow line, input shaft 12, gear 33, gear 38, gear 39, gear 34, shifter 43, transmission shaft 31, gear 37, gear 42, shifter 45, secondary shaft 32 is formed and, through this line, the power is transmitted to provide 1 speed or 1F.

Next, the shifter 43 is shifted in the A direction and shifter 45 is in the 2F direction to couple the gear 41 with the secondary shaft 32. Thereby, the flow line, gear 36, gear 41, shifter 45, secondary shaft 32, wherein the route until the gear 35 is the same as in the case of 1F, is provided as 2 speed or 2F.

Further, when the shifter 43 is shifted in the A direction and shifter 44 is in the 3F direction to couple the gear 40 with the secondary shaft 32. Thereby, the flow line, gear 35, gear 40, shifter 44, secondary shaft 32, wherein the route until the gear 35 is the same as in the cases of 1F and 2F, is provided as 3 speed or 3F.

Then, the shifter 43 is shifted in the B direction to directly couple the gear 33 with the transmission shaft 31 and the shifter 45 is shifted in the 1F direction to couple the gear 42 with the secondary shaft 32. Thereby, the flow line, input shaft 12, gear 33, shifter 43, transmission shaft 31, gear 37, gear 42, shifter 45, secondary shaft 32 is provided as 4 speed or 4F.

In the 4F mode as mentioned, if the shifter 45 is provided at 2F and other elements are kept at 4F, the flow line, gear 36, gear 41, shifter 45, secondary shaft 32, provide a 5 speed or 5F.

In the 5F mode as mentioned, if the shifter 44 is provided at 3F and other elements are kept at 4 and 5F, the flow line, gear 35, gear 40, shifter 44, secondary shaft 32 is provided as 6 speed or 6F.

A hydraulically operated shuttle transmission mechanism 47 is provided at the outlet side of the transmission mechanism 30 and has a clutch body which is submerged in oil contained in the lower portion of the transmission case 5.

Figure 4:
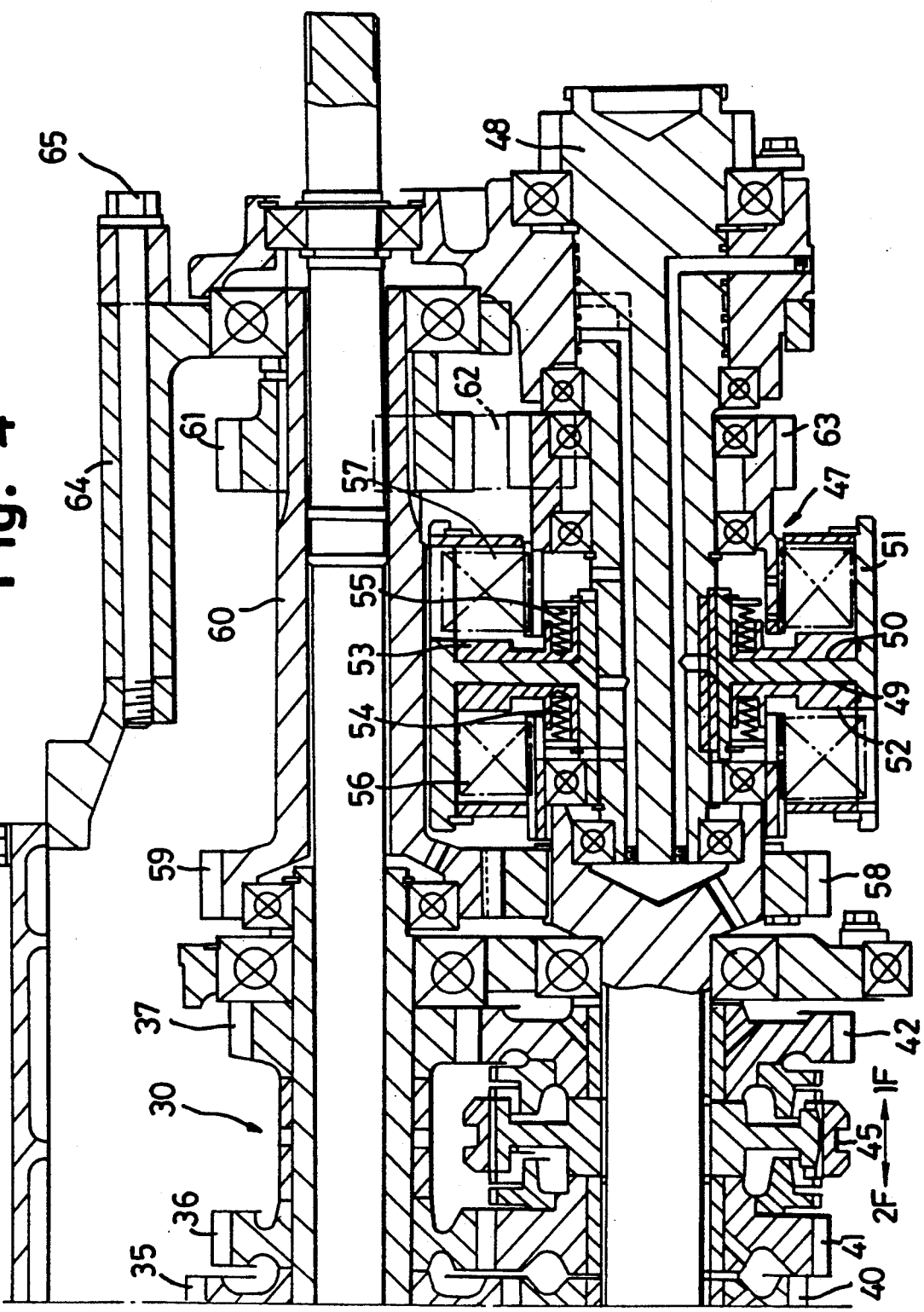
FIG. 4 is an elevation view, in section, of the rear portion of the transmission mechanism and a hydraulically operated shuttle transmission mechanism in the transmission system of the present invention.

More specifically, the hydraulically operated shuttle transmission mechanism 47 includes a clutch shaft 48 extending coaxially and rearwardly of the secondary transmission shaft 32, as shown in FIG. 4. A clutch body 51 is mounted on the clutch shaft 48 and defines a front chamber 49 and a rear chamber 50. Pistons 52 and 53 are slidably received in the respective cylinder chambers 49 and 50 to urge clutch elements 56 and 57 against the action of springs 54 and 55. The clutch shaft 48 is rotated in a clockwise direction when the clutch element 56 is urged, whereas the clutch shaft 48 is rotated in a reverse or counterclockwise direction when the clutch element 57 is urged. Such rotation of the clutch shaft 48 is transmitted to a differential 66 through a bevel pinion shaft 66A to drive the differential 6. The differential 66 is located behind the clutch shaft 48.

The shuttle transmission mechanism 47 also includes a shaft 60 on which a gear 59 is mounted for meshing engagement with a gear 58 which is, in turn, mounted on the rear portion of the secondary transmission shaft 32. A gear 61 is mounted on the rear portion of the shaft 60 and operatively connected to a gear 63 through an idler gear 62.

An intermediate case 64 is secured between the transmission case 5 and a rear transmission case 67 by bolts 65 and used to house the hydraulically operated shuttle transmission mechanism 47. The rear transmission case 67 is also used to house the differential 66 and related components.

In FIG. 1, a longitudinally extending transmission shaft 69 is housed in the transmission case 5 to drive the front wheels and coupled to the bevel pinion shaft 66A by transmission means 68. A hydraulic clutch 70 is mounted to the front end of the transmission shaft 69 and located below the hydraulically operated speed mode change mechanism 9. Two different transmission means 71 and 72 are arranged at front and rear sides of the hydraulic clutch 70, respectively. A front wheel drive power takeoff shaft 73 extends between the two transmission means 71 and 72 and is coupled to a propeller shaft for the front wheels.

According to the present invention, the automotive transmission system comprises the transmission mechanism housed in the transmission case and operatively connected to the engine, and the hydraulically operated speed mode change mechanism and shuttle transmission mechanism both operatively coupled to the transmission mechanism. The hydraulically operated speed mode change mechanism is located at the input side of the transmission mechanism. The hydraulically operated shuttle transmission mechanism is located at the outlet side of the transmission mechanism and housed in the lower portion of the transmission case 5. With this arrangement, the both speed mode change mechanism and shuttle transmission mechanism are actuatable by respective valves and independently operable by means of levers or buttons. This design substantially improves the operability and manueverability of the system as well as the working efficiency.

Additionally, the hydraulically operated shuttle transmission mechanism is submerged in oil in the lower portion of the transmission case behind the transmission mechanism. The mechanism is capable of withstanding a great torque if generated and is, thus, durable.

What is claimed is:

1. A vehicular transmission system comprising a transmission case housing providing an internal space for positioning change gear means operatively connected to an engine for changing gears to control a running speed of a vehicle comprising:

hydraulic speed mode change means disposed on an input side of the change gear means and in the vicinity of the engine;

a hydraulic shuttle transmission means disposed on an output side of the change gear means and being submerged in an oil bath at a bottom of a transmission case located at a distance from the engine;

said hydraulic speed mode change means comprising a ring gear secured to a drive axle operatively connected to the engine, a carrier is rotatably connected by the ring gear and having a sun gear coaxially positioned relative thereto, a plurality of planetary gears are connected by the carrier and meshed with the ring gear and the sun gear, an output shaft is coaxially positioned relative to the drive axle and extends to coaxially connect with the carrier and serves as an input shaft for the gear change means, a sleeve support is sheathed by the output shaft and is secured to a wall of the transmission case, a clutch body is sheathed and rotatably connected by a cylindrical sleeve portion of the support and is connected to the sun gear, a hydraulic piston is received in a cylinder chamber of the clutch body and is shiftable to lock, unlock the carrier with aid of a clutch device;

said hydraulic shuttle transmission means including a clutch shaft extending coaxially rearwardly of a secondary shaft of the gear change means, and a clutch body is mounted on said clutch shaft and defines front and rear cylinder chambers, pistons are received in said cylinder chambers, and clutch elements are urged by said pistons against action of springs such that said pistons are slid against said spring to press said clutch elements, wherein when one clutch element is pressed, said clutch shaft is made to rotate normally; when the other clutch element is pressed, said clutch shaft is made to rotate reversely, and reversible rotations are transmitted, with aid of said clutch shaft, to a differential device located rearward thereof.

2. The vehicular transmission system according to claim 1, wherein said change gear means for changing gears to control a running speed is interposed between the speed change mode means for shifting a speed mode hydraulically and the shuttle transmission means for hydraulic shuttle shifting, said change gear means includes a mechanism for changing gears by always meshed synchronous system for shifting gears by shifters, said gears being mounted on a transmission shaft having one end thereof connected to and extending coaxially from the axle of said hydraulic speed mode means and also mounted on a secondary transmission shaft juxtaposed to the transmission shaft in parallel, wherein said gear change means includes a secondary transmission sector including gear means for shifting high/low speeds at a position adjacent to said hydraulic speed mode means, and includes, at a position adjacent to said shuttle change means, a main transmission mechanism for being driven by torque shifted by the secondary transmission sector.

3. The vehicular transmission system according to claim 1, wherein said shuttle transmission means for hydraulic shuttle shifting is housed in an adjacent case, said adjacent case being secured between a rear side of the transmission case and a front side of a rear transmission case incorporating the differential device for rear wheels.

4. The vehicular transmission system according to claim 1, wherein said axle shaft is operatively connected to the engine through a main clutch, said axle shaft being of a sleeve construction, into which a power take-off drive shaft is operatively positioned for connecting to the engine.

* * * * *